Dec. 1, 1942.  A. DRUCKER  2,303,920
PHOTOGRAPHIC APPARATUS
Filed March 30, 1940  4 Sheets-Sheet 2
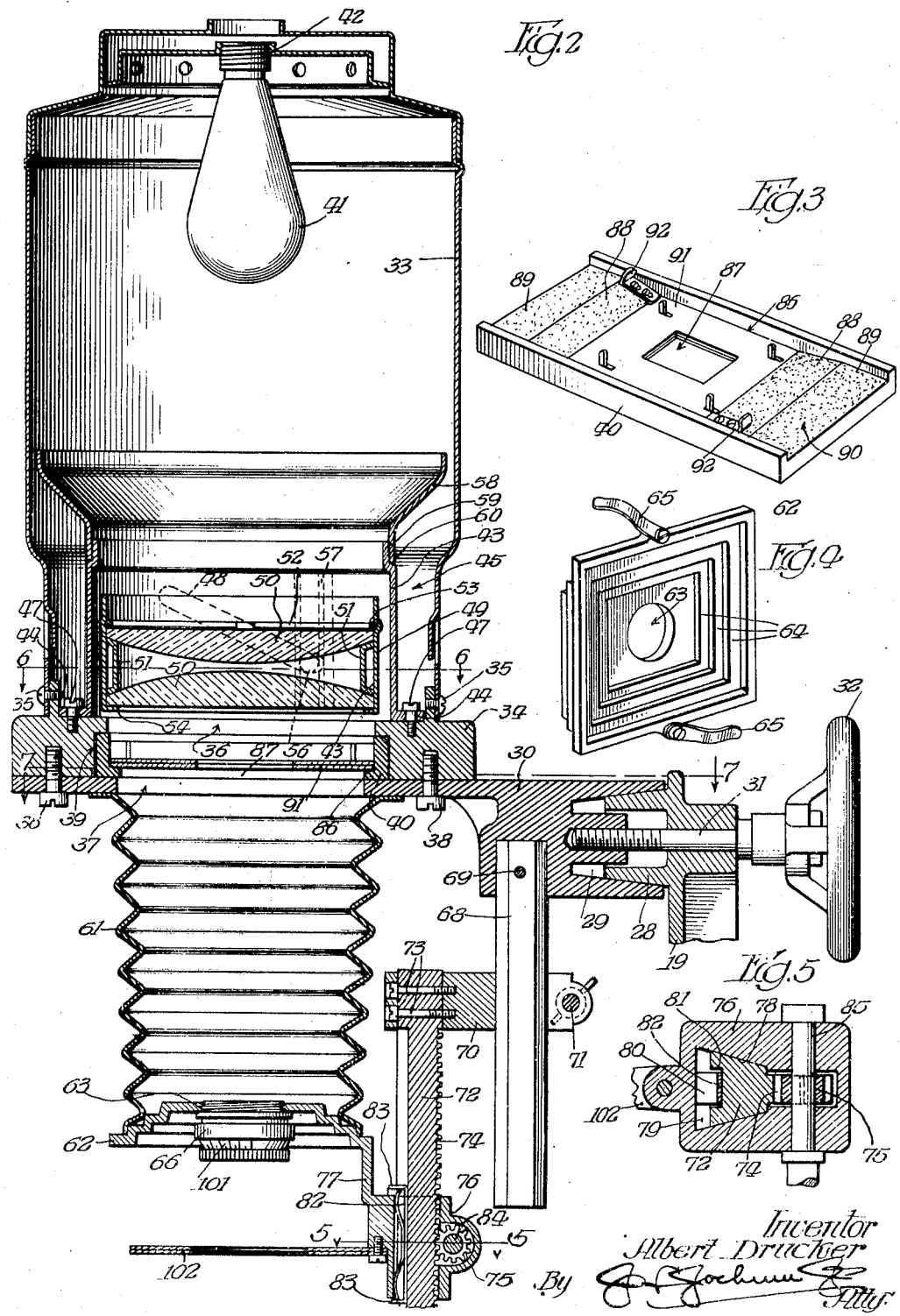
Inventor
Albert Drucker
By
Atty.

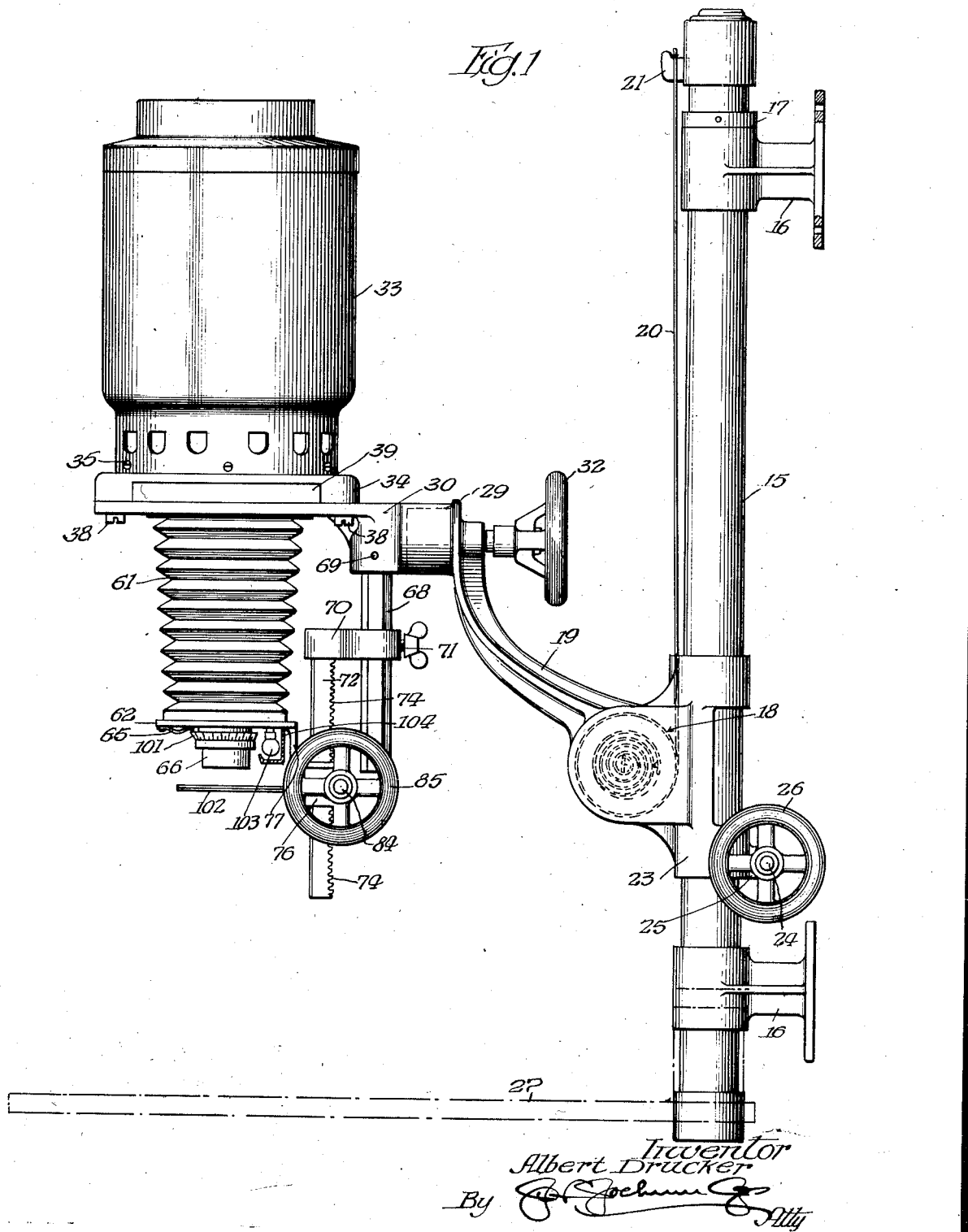

Dec. 1, 1942. A. DRUCKER 2,303,920
PHOTOGRAPHIC APPARATUS
Filed March 30, 1940 4 Sheets-Sheet 3
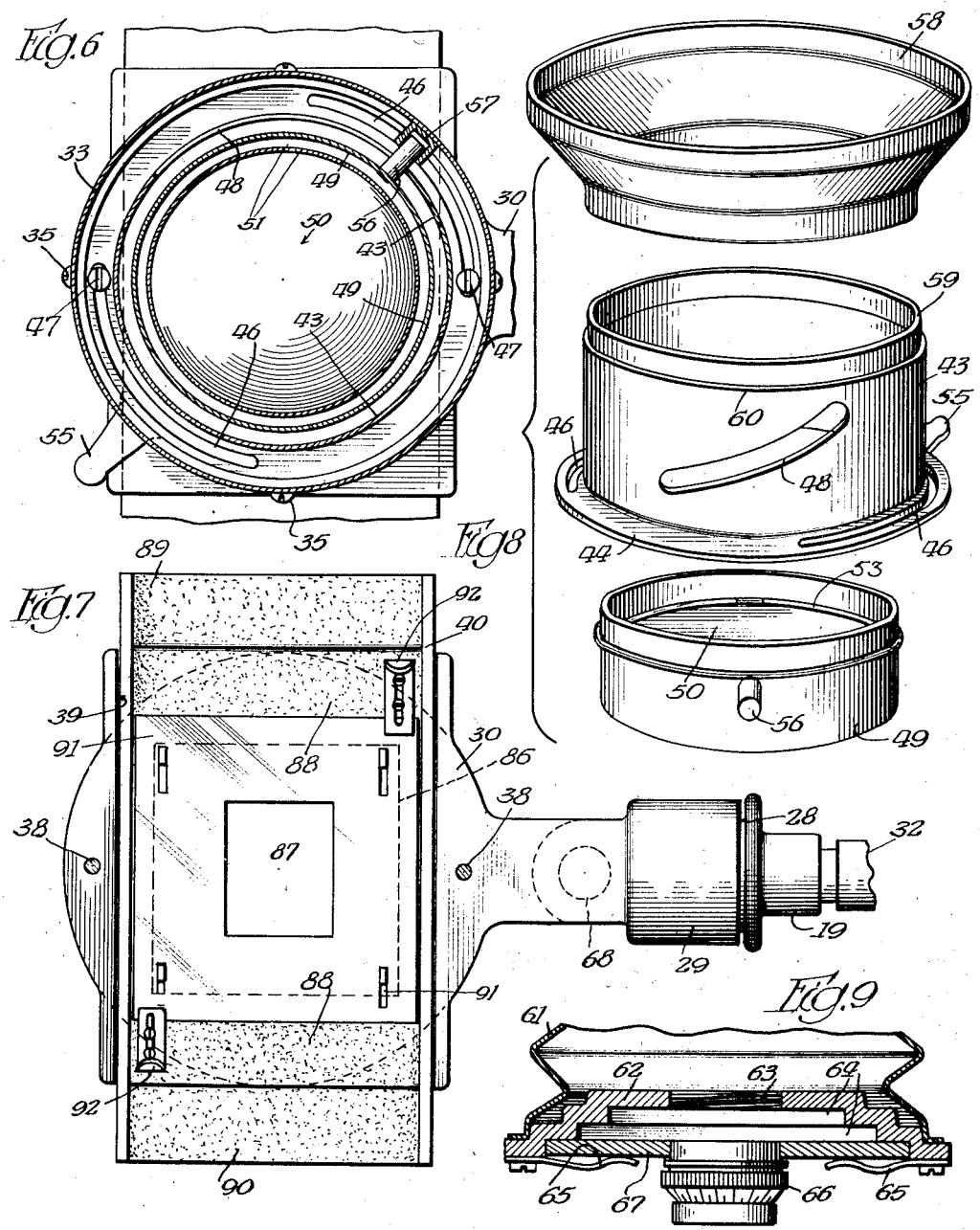
Inventor
Albert Drucker
By [signature]
Atty.

Dec. 1, 1942.    A. DRUCKER    2,303,920
PHOTOGRAPHIC APPARATUS
Filed March 30, 1940    4 Sheets-Sheet 4
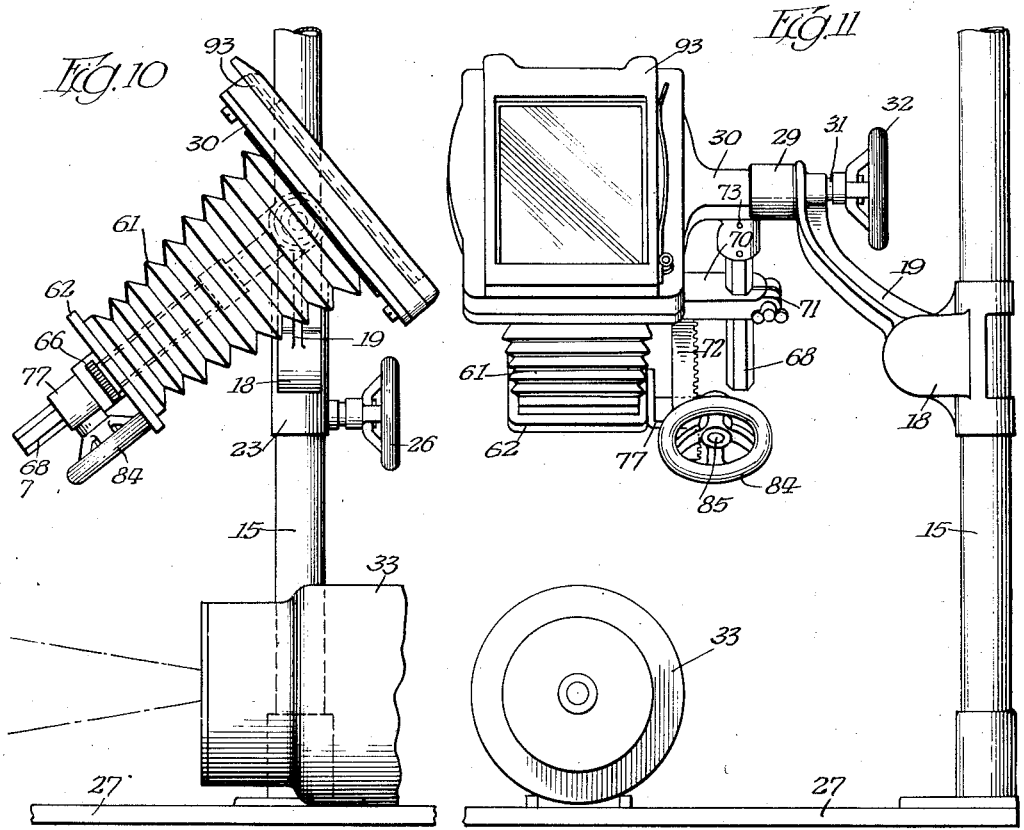
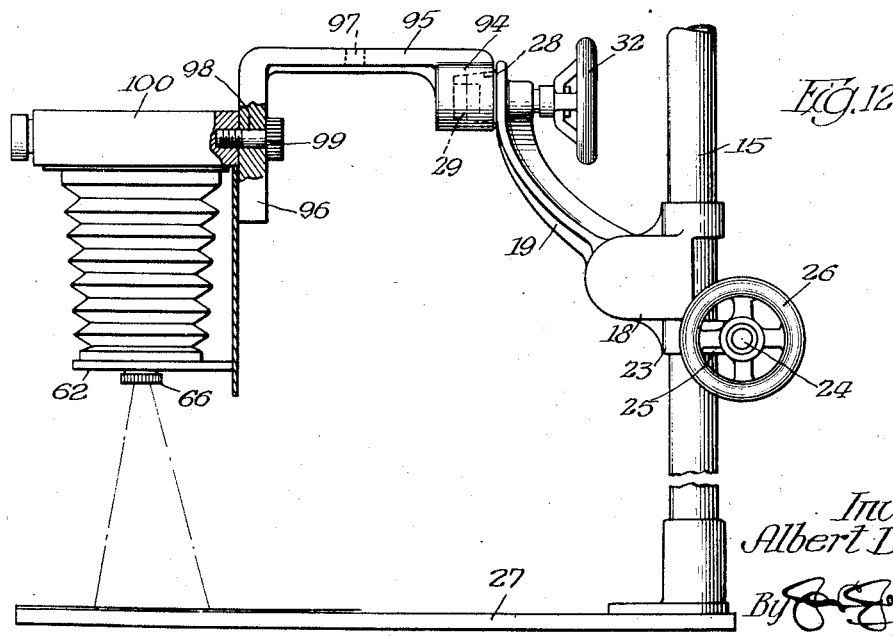
Inventor
Albert Drucker
By [signature]
Atty.

Patented Dec. 1, 1942

2,303,920

UNITED STATES PATENT OFFICE 2,303,920

PHOTOGRAPHIC APPARATUS

Albert Drucker, Chicago, Ill., assignor to Burke & James, Inc., Chicago, Ill., a corporation of Illinois Application March 30, 1940, Serial No. 326,951

4 Claims. (Cl. 88—24)

This invention relates to improvements in photographic apparatus and one of the objects of the same is to provide improved equipment of this character which is adapted for use for photographic enlarging, as a camera, a camera support, a combined source of illumination with a camera, as a photo-micrographic camera, and for many other purposes.

A further object is a provide an improved apparatus of this character which will be of compact construction and arrangement and which may be readily converted from one use to another and may also be readily transported if desired.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a side elevation of an apparatus of this character constructed in accordance with the principles of this invention.

Figure 2 is an enlarged vertical sectional view of Figure 1 with parts omitted.

Figure 3 is a detail perspective view of a film or negative holder.

Figure 4 is a detail perspective view of a lens supporting board.

Figure 5 is a sectional view, on an enlarged scale, taken on line 5—5 Figure 2.

Figure 6 is a sectional view taken on line 6—6 Figure 2.

Figure 7 is a sectional view taken on line 7—7 Figure 2 with parts broken away.

Figure 8 is a perspective exploded view of the condenser lens carrying an adjusting mechanism.

Figure 9 is an enlarged detail sectional view of the front of the camera and the lens supporting board.

Figure 10 is a side elevation of another adaptation of the invention.

Figure 11 is a right hand side elevation of Figure 10.

Figure 12 is a view partly in elevation and partly in section of still another form of the invention.

Referring more particularly to the drawings, the numeral 15 designates a supporting standard which is rotatably mounted in brackets 16 that may be secured to a supporting wall. A collar 17 may be provided on the standard for preventing displacement thereof with respect to the brackets.

Slidably mounted upon the standard 15 is another bracket 18 having an arm 19 and this together with the mechanism supported thereby may be counterbalanced in any suitable manner such as by means of a tape or flexible member 20 removably anchored as at 21, and secured at its lower end to a spring controlled drum 22 which latter is housed within the bracket 18. The bracket 18 is provided with a split collar 23 and a screw 24 passes through ears 25 of the collar for clamping the collar upon the standard to hold the bracket 18 in its adjustable position; a hand wheel 26 may be provided for operating the screw or clamping element 24.

If desired, however, instead of mounting the standard 25 to swing in the brackets 16 the standard may be provided with a base 27 so as to engage and rest upon a suitable support or table.

Carried by the bracket 19 and projecting laterally therebeyond is a bearing element 28, preferably of conical configuration and this bearing is adapted to enter a similarly shaped socket 29 in a support 30. A screw 31 passes through the bracket 19 and into the support 30 and connected to the screw is a hand wheel 32. By operating the screw 31 to release the support 30 with respect to the arm 19 of the bracket 18, the support may be rotatably or angularly adjusted with respect to the arm 19 so as to position the supporting surface of the support 30 at any desired angle. By tightening the screw 31 the conical bearing 28 will be forced into the socket 29 and the support will thereby be frictionally held against adjustment with respect to the bracket arm 19.

Mounted upon the support 30 is a housing 33 of any desired size and configuration and has an open end adapted to be closed by a base 34 to which the housing may be separably secured by means of suitable fastening devices, such as screws 35 or the like.

The base 34 is provided with an opening 36 which registers with an opening 37 in the support 30, and this base is removably secured to the support 30 in any suitable manner, such as by means of fastening screws 38. Within the base 34 is a recess 39 having oppositely disposed openings in the wall thereof to form a chamber or space into which a plate or negative holder 40 is adapted to be inserted and from which it may be freely removed, and which negative holder will be hereinafter more fully described.

Within the housing 33 is arranged a lamp 41 secured in a socket 42 and the lamp is preferably disposed in alinement with the openings 36 and 37.

An annular wall 43 is provided within the housing 33 and is preferably provided with a flanged base 44 shown more clearly in Figure 3. This wall 33 may be of any desired height and is arranged within the housing 33 so as to form an encompassing space 45 intermediate the wall and the wall of the housing 33. The annular member or wall 43 is adapted to be rotatably adjusted within the housing and to that end there may be provided slots 46 in the flange 44, through which slots screws 47 pass and enter the base 34. The ends of the slots 46 cooperating with the screws 47 serve as a means for limiting the rotation of the annular member or wall 43. This member 43 is also provided with a slot 48 in its wall and this slot is preferably arranged in an inclined position.

Within the annular member 43 is disposed a lens carrier 49 having one or more condenser lenses 50 mounted therein, the lenses being spaced from each other by means of an annular spacing member 51, and a split fastening ring 52 engaging in a recess 53 in the annular member 43 serves to hold the condenser lenses in position within the holder, one of the lenses resting upon a circumferential flange 54.

Connected to the annular member 43 is an operating handle 55 which extends to the outside of the housing 33 and this handle is for the purpose of rotating the annular member 43.

When the annular member 43 is rotated, the lens carrier 49 will be bodily moved in directions towards and away from the light 41 according to the direction of rotation of the annular member. This movement of the lens carrier is effected through the medium of a pin or lug 56 which is carried by the lens carrier and projects into the slot 48. The pin or lug 56 projects for a substantial distance beyond the outer surface of the annular member 43 and enters an upright guide 57 which is secured to the wall of the housing 33.

With this construction it will be manifest that when the annular member 43 is rotated through the medium of the handle 55 and inasmuch as the lens carrier 49 is held against rotation by means of the pin 56 entering the guide 57, the lens carrier will be moved in a direction lengthwise of the axis of the lenses 50 by reason of the fact that the walls of the slot 48 serve as cams operating against the pin or lug 56 to raise and lower the lens carrier.

In order to prevent the light rays from passing through the space 45 between the annular member 43 and the wall of the housing 33, a light shade ring 58 is provided to extend across the space, and this ring 58 preferably telescopes with a reduced portion 59 of the annular member 43 and rests upon a shoulder 60 so that the ring 58 will be rotated with the annular member 43.

Secured to the other side of the support 30 is an expansible and contractible closure 61, preferably in the form of a bellows, for the opening 37 in the support 30 and the base 34 of the housing 33. At the forward end of this closure 61 is secured a lens supporting member 62 having an opening 63 therein. Within this member 62 and opening through one face thereof are a series of recesses 64 which encompass each other and also the opening 63, thereby forming stepped recesses into which a lens supporting board (not shown) is adapted to be seated and selectively positioned according to the size of the board, and which boards when in position may be removably secured by means of suitable spring clips 65.

A focusing lens unit 66 may be secured in the opening 63 of the lens board support 62 in any suitable manner either by screw threads, bayonet joints, or in any other suitable manner.

This unit 66 may be secured either directly in the opening 63 or may be secured in a lens supporting board 67 (see particularly Figure 9) which latter is provided with an opening for that purpose, the particular size board 67 to be employed so that it will fit into either one of the recesses 64 according to the nature of the work desired.

When the lens unit 66 is secured to the board 67 the opening 63 in the bottom of the lens support 64 will be arranged in alinement with the opening of the lens opening 63.

As a means for adjusting the lens board supporting member 62 there may be provided a supplemental support 68 which is secured, as at 69, to the support 30 to depend therefrom and this supplemental support may be of any desired configuration in cross-section, but is preferably angular.

A collar 70 is adjustably supported on the supplemental support 69 and is adapted to be held in position with respect thereto by means of a suitable clamping screw 71. An additional support 72 is secured to the collar 70 by means of suitable fastening devices 73 and depends therefrom, the support 72 being substantially parallel with the support 68.

The supplemental support is preferably in the form of a rack having teeth 74 which mesh directly with a pinion 75 housed within a sleeve or collar 76 which latter is connected, as at 77, with the lens board supporting member 62 and this constitutes a rack and pinion focusing mechanism for the lens board support 62.

The member 72 is preferably of a trapezoid shape in cross-section, as shown more clearly in Figure 5, and the collar 76 is provided with a portion 78 which is also of approximately trapezoid shape to conform to the configuration of the rack member 72 in cross-section.

This space in the collar is of a length considerably greater than the cross-sectional dimension of the rack member 72 to form a space 79 in which a spring 80 is located, the spring being seated in a recess 81 in the rack member 72. If desired, and in order to prevent the spring from dropping out of position, there may be provided a cap shaped member 82 also seated in the recess 81 and having flanges 83 at the top and bottom thereof to engage over a portion of the collar 76.

The pinion 75 may be rotated in any suitable manner such as by means of a hand wheel 84 connected to a shaft 85 of the pinion.

It will thus be seen that in addition to providing a rack and pinion means for adjusting the focusing lens, to extend the closure 61, there will be provided an adjustment means whereby the extent of adjustment of the extensible closure may be varied and this is accomplished through the medium of the supplemental support 68 and the collar 70 adjustably mounted thereupon.

The negative or film carrying member is preferably of a tray-like configuration having a recess 86 preferably disposed centrally thereof with reference to the length of the holder and through the bottom of which recess an opening 87 is provided.

The portions of the holder 40 adjacent the end walls thereof are preferably inclined, as at 88, at the outer extremities of which there may be arranged a horizontal portion 89 and these surfaces 88—89 are preferably covered by any suitable soft material, such as felt or the like, so as to prevent scratching of the film or negative while being placed within the holder 40. The negative carrier 91 may be of any desired configuration but in the present form of invention consists of two metal plates having registering openings and between which plates the negative or film is placed. This holder is adapted to be seated in recess 86 and is removably secured in position by means of suitable fastening clips 92.

When the negative holder 91 is placed in position in the holder 20, the holder is inserted in the recess 39 in the base 34 of the housing 33 and the opening 87 in the bottom of the recess 86 will be in alinement with the opening 37 in the support 30 and of the focusing lens 66.

In the form of the invention shown in Figure 10 the housing 33 has been removed and in lieu of the housing there is secured to the support 30 a plate holder 93 of any ordinary and well known construction and in this instance the extensible closure 61 and the lens unit 66 will constitute a photographic camera, the plate being adapted to be inserted in the plate holder 93 in the ordinary and well known manner.

When the apparatus is used in the manner disclosed in Figures 10 and 11 and the housing 33 is detached from the support 30, the unit comprising the housing, the light 41 and the condensing lenses 50 may be placed in the position shown in the said figure to serve as a source of illumination.

In Figure 12 the support 30 is entirely removed from the arm 19 of the bracket 18 and in lieu thereof there is attached to the arm 19 through the medium of a socket 94 that co-operates with the socket member 28, another form of support 95 which latter is provided with a flange 96 arranged at right angles to the base of such support. This supporting member is provided with openings 98 therethrough for the reception of a fastening screw 99 which is adapted to engage into a portion of the body of any form of camera 100 so that the latter may be selectively positioned by there being attached to the flange 96 or to the body portion of the support 95, for photographic or other purposes.

The lens 66 is provided with indication marks 101 on the outer periphery thereof for indicating adjustment of the lens with respect to the lens board supporting member 62, and it is frequently inconvenient to inspect these graduations or indications 101 to properly effect such adjustment, as this apparatus is generally employed in a darkroom and a housing or shield 102 is also generally employed with the lens.

Therefore, in order to facilitate the adjustment of the lens there may be provided any suitable means which is exterior of the camera and is so disposed as to direct light rays upon or to cause an illumination of the outer surface of the lens unit.

In the present form of the invention a lamp 103 is disclosed which is arranged in proximity to the outer surface of the lens 66 and this light receives its energy from any suitable source, such as a storage battery (not shown) or from any other source. A shield 104 may also be provided for the light. This light may be of very low voltage so as not to cause undue illumination but is only of a strength to cause sufficient illumination of the outer surface of the lens to permit the indications 101 to be read, without interfering or causing any undue rays of light to effect the operation of the apparatus.

While the preferred forms of the invention have been herein shown and described, it is to be understood that various changes may be made in the details of construction and in the combination and arrangement of the several parts, within the scope of the claims, without departing from the spirit of this invention.

What is claimed as new is:

1. An apparatus of the character described embodying a light housing having an opening through one wall, a bellows extending from said opening, and a lens support at the end of said bellows, said support having a plurality of recesses for receiving lens boards, said recesses increasing in transverse dimension from one face to the opposite face of said support to form a plurality of steps.

2. An apparatus of the character described embodying a light housing having an opening through one wall, a bellows extending from said opening, a lens support at the end of said bellows, said support having a plurality of recesses for receiving lens boards, said recesses increasing in transverse dimension from one face to the opposite face of said support towards the opposite face to form a plurality of steps, and lens board retainers carried by said lens support for removably holding said lens boards in position.

3. A lens board support for cameras and the like and embodying an opening therethrough, one face of said support being provided with a plurality of steps encompassing said opening to provide spaces of different cross-sectional dimensions to receive lens boards of different sizes.

4. A lens board support for cameras and the like and embodying an opening therethrough, one face of said support being provided with a plurality of steps encompassing said opening to provide spaces of different cross-sectional dimensions to receive lens boards of different sizes, and lens board retaining means carried by the said support.

ALBERT DRUCKER.